United States Patent [19]

Weinhold

[11] Patent Number: 4,496,176
[45] Date of Patent: Jan. 29, 1985

[54] DEVICE FOR CONNECTING FLANGED PIPES

[76] Inventor: Karl Weinhold, Im Jagdfeld 43, 4040 Neuss, Fed. Rep. of Germany

[21] Appl. No.: 448,801

[22] Filed: Dec. 10, 1982

[30] Foreign Application Priority Data

Dec. 16, 1981 [DE] Fed. Rep. of Germany ....... 3149833

[51] Int. Cl.³ .................... F16L 17/00; F16L 23/00
[52] U.S. Cl. .................................. 285/365; 285/409; 285/108; 285/110; 285/113; 277/205
[58] Field of Search ............... 285/365, 408, 409, 410, 285/411, 108, 110, 112, 113; 277/205, 206 R, 227

[56] References Cited

U.S. PATENT DOCUMENTS

| 2,486,120 | 10/1949 | Colton et al. | 285/110 |
| 3,627,335 | 12/1971 | Wheeler | 277/205 |
| 3,957,278 | 5/1976 | Rabe | 277/205 X |
| 4,272,871 | 6/1981 | Weinhold | 285/409 X |

FOREIGN PATENT DOCUMENTS

| 15664 | 10/1958 | Fed. Rep. of Germany. |
| 2405827 | 6/1975 | Fed. Rep. of Germany. |
| 2807893 | 8/1979 | Fed. Rep. of Germany. |
| 213654 | 5/1941 | Switzerland | 285/108 |
| 860905 | 2/1961 | United Kingdom | 285/110 |

Primary Examiner—Richard J. Scanlan, Jr.
Attorney, Agent, or Firm—Spencer & Frank

[57] ABSTRACT

The invention relates to a device for connecting flanged pipes. For this purpose, a multiple-section clamp is mainly used which includes inwardly protruding flanges engaging beyond the collars of the pipe ends. An annular profiled seal forms an approximately U-shaped hollow profile with the shanks which are formed as sealing lips and which abut against the peripheral surfaces of the collars. The assembly of the profiled seal is difficult. The sealing effect is often impaired by the peripheral surfaces of the collars being no longer sufficiently even and smooth. These drawbacks are removed by the invention such that the profiled seal has an inner profiled section extending between the faces of the collars and that the outer surfaces of the outer profiled section surrounding the peripheral surfaces of the collars are reinforced at a guide ring. Thus, the particular sealing region is disposed between the faces of the collars. The assembly is simplified by the reinforced outer profiled section of the profiled seal.

19 Claims, 5 Drawing Figures

FIG. 3
FIG. 4
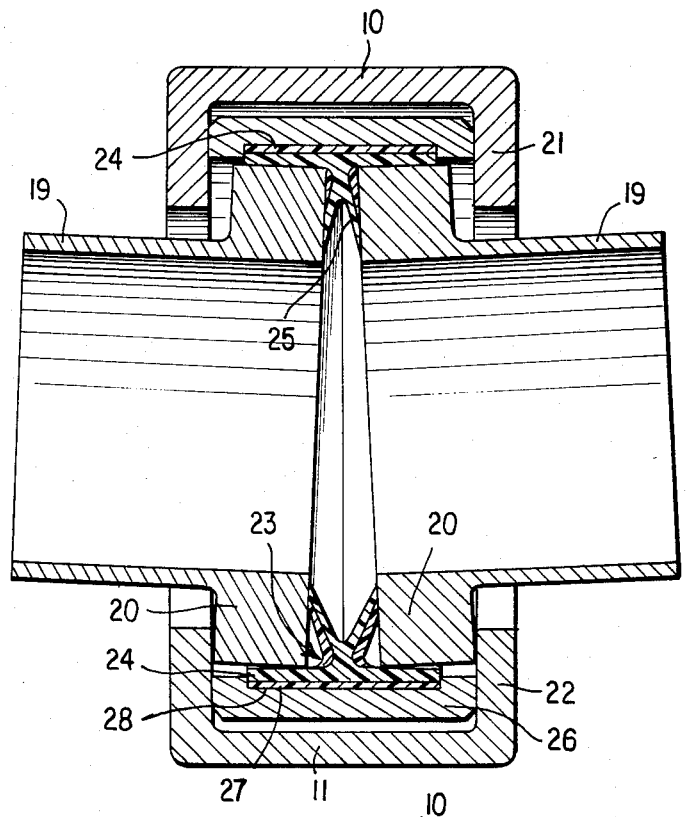
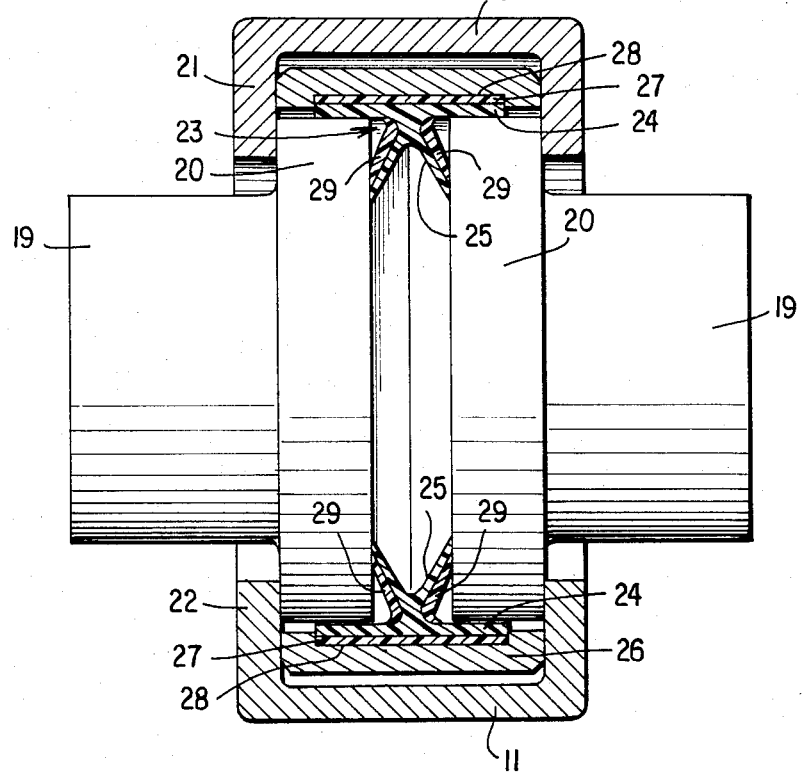

DEVICE FOR CONNECTING FLANGED PIPES

BACKGROUND OF THE INVENTION

The invention relates to a device for connecting flanged pipes, with a multi-part clamp, having inwardly protruding flanges which engage the collars of the pipe ends at the rear ends thereof, and with an elastic profiled seal surrounding the peripheral surfaces of the collars.

A device of such type is known wherein the clamp consists of two semicircular clamp portions held together by bolts. Inwardly of the clamp, a profiled seal extends, whose cross-section has approximately the shape of a "U" with relatively short shanks. The free ends of these shanks are formed as sealing lips sealingly engaging the peripheral surfaces of the collars. Since an axial spacing remains between the faces of the two collars, the working medium pressure can press both the profiled seal against the inner side of the clamp and the lip seals, formed by the shanks, onto peripheral surfaces of the collars.

The assembly of a device of such type is relatively difficult since the flanged pipes usually having the length of several meters, must be brought to such a position relative to each other that the profiled seals can first be put on and thereupon the clamp sections are applied. Since the profiled seal is relatively weak, the flanged pipes must be maintained exactly in a mutually coaxial position. Otherwise, the profiled seal could be damaged or at least overstretched. A further drawback resides in that the sealing surfaces are disposed at the outer periphery of the collars. The peripheral surfaces of the collars are often damaged by outer mechanical effects during the transport or on assembly, so that they no longer form smooth and even sealing surfaces.

SUMMARY OF THE INVENTION

It is an object of the present invention to produce a device suitable for connecting flanged pipes by simple means such that the assembly is considerably simplified. Also, the danger of damaging the sealing surfaces is to be reduced.

In order to solve this problem, it is proposed according to the invention, that the profiled seal have an inner profiled section extending between the faces of the collars, and that the outer profiled section surrounding the peripheral surfaces of the collars is reinforced at a guide ring.

Thus, the specific sealing region is now disposed between the faces of the collars, which are known to be far less likely to become subject to damages resulting in unevenesses which render the sealing more difficult. Due to the reinforcement of the outer profiled sections, the same can serve as a guide through which the holding of the flanged pipes in a mutually co-axial position can be substantially simplified during the assembly. Also, the inner profiled section which is essential for the obtaining of the sealing effect, is not stressed to an unacceptable degree during the assembly.

According to an advantageous embodiment of the invention, the inner profiled section can be at least approximately V-shaped in cross-section and can form two sealing lips each of which engages one of the faces of the associated collar. Thus, the sealing lips are pressed against the faces of the collars by the pressure of the working medium in a particularly effective way.

The reinforcement of the outer profiled section can be effected for instance by corresponding armouring and/or by selecting a suitable material. The outer profiled section can be dimensioned in each case so that they are thick enough to withstand the forces brought about by the pressure of the working medium and effective in the radial direction.

According to a particularly advantageous embodiment of the invention, the guide ring can be formed by a sleeve, in which the profiled sealing is inserted. In most cases, a particular reinforcement of the outer profiled section is achieved relative to the inner profiled section of the profiled seal.

It is further of advantage, according to the invention, if the sleeve slightly overlaps the outer profiled section in the axial direction and extends up to the inner surfaces of the flange. By such arrangement, it is achieved that the profiled seal remains always at a central position of the clamp, regardless of relative displacement of the collars with respect to each other. If the sleeve is not used for reinforcing the outer profiled section, the outer profiled section can extend up to the inner side of the flange, in the fashion corresponding to a guide ring reinforced outer profiled section.

According to a further embodiment of the invention, it is proposed that the outer portion be formed as a multi-layer part, consisting of an outer layer of a softer material than the inner layer, and that the outer profiled section be inserted in an inner annular groove of the sleeve. This insertion is facilitated by the softer character of the outer layer. The stronger inner layer can still engage the angular groove with a part of its cross-section. Independent of the same, a good hold of the profiled sealing in the axial direction is assured by the engagement in the annular groove.

Furthermore, it is proposed according to the invention that the inner profiled section be formed as a multi-layer part and that the outer layer consist of a softer material than the inner layer. In such a case, the softer outer layer serves the purpose of filling in the space disposed between the sealing lips and the outer profiled section thus preventing the turning away of the sealing lips in such space. This effect can be obtained in an even stronger way when the outer layer of the inner profiled section has a thickness increasing in the direction towards the outer profiled section. Herein, the space disposed between the sealing lips and the outer profiled secton can be filled entirely by the softer outer layer of the inner profiled section.

On the other hand, however, it is also conceivable according to the invention that the face surfaces of the collars have each in its outer peripheral region a bulge protruding in the axial direction. This is then disposed in the space located between the sealing lips and the outer profiled section and can as well take over the aforesaid function, entirely or partly.

In general, the clamp of the device is so dimensioned that the flanged pipes are deflectable relative to each other from their co-axial position by at least a small angle. In an extremely deflected position, the danger could eventually occur that the peripheral edges of a collar facing in the direction towards the associated flange could become crushed or hooked on the outer profiled section of the profiled seal. In order to exclude this danger, it is proposed according to the invention that the peripheral edge of a collar facing a flange remain at a spacing from the outer profiled section even when the flanged pipes are deflected from their mutually co-axial position.

In order to secure better guidance of the collars inside the clamp on deflection from a mutually co-axial position, it is further proposed according to the invention that the collars have conical or spherical transition surfaces extending in the direction towards the pipe jacket and that the inner peripheral surfaces of the flange be complementary with this shape.

Furthermore, it is proposed according to the invention that the clamp be produced from clamp sections clampable with each other, which are connected to each other at one end thereof by a hinge pin, and that the sleeve or the outer profiled section comprise a holder extending in the radially outward direction, which engages the hinge pin. The sleeve or the profiled seal can thus be connected with the clamp, whereby the placement of the clamp sections onto the profiled seal during the assembly is facilitated. Also, the sleeve or the profiled seal cannot become lost.

In the following, individual exemplary embodiments of the invention will be described in detail with reference to a drawing.

BRIEF DESCRIPTION OF THE DRAWINGS

FIG. 3 is a longitudinal section of the device with flanged pipes deflected from their mutually co-axial position;

FIG. 4 is a longitudinal section of the same arrangement on a mutually co-axial position of the flanged pipes;

DESCRIPTION OF THE PREFERRED EMBODIMENTS

Figure 1:
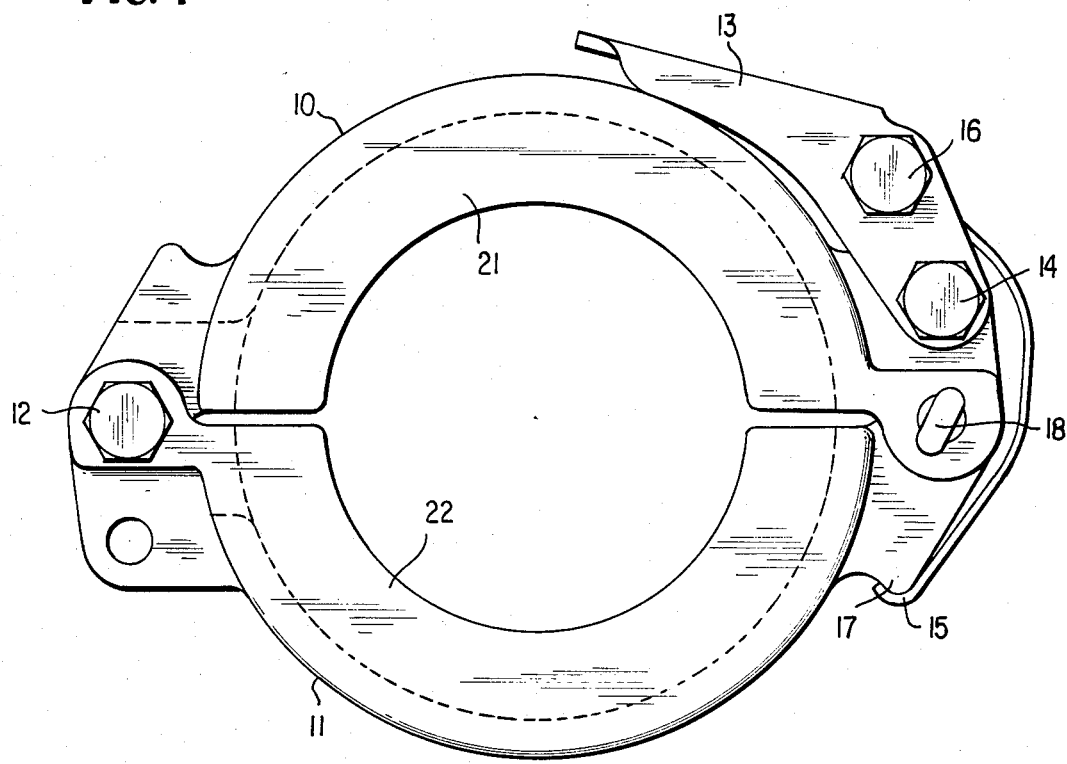
FIG. 1 is a front view of the device seen in the axial direction.

The device shown in FIGS. 1 through 4 has a clamp formed from two clamp sections 10 and 11. The clamp sections 10 and 11 are held together at one end thereof by a bolt serving as a hinge pin 12. The clamp sections 10 and 11 can thus be clamped one with the other when the device is to be assembled. A gripping lever lock engaging at the ends of the clamp sections 10 and 11 disposed one opposite the other, and having a gripping lever 13, serves the purpose of holding together the clamp sections 10 and 11. The same is secured by means of a bolt 14 to the clamp section 10. A spring 15 engages with its one end a further bolt 16 passing through the locking lever 13. The other end of the spring 15 is hook shaped and engages a protrusion 17 formed at the associated end of the other clamp section 11. A securing pin 18 passes through the corresponding bores in both clamp sections 10 and 11 and prevents an uncontrolled disengagement of the clamp sections 10 and 11 from each other on unintentional release of the clamping lever 13.

In this device, the ends of two flanged pipes 19 are to be held together, each of which is provided with a collar 20. The clamp sections 10 and 11 have inwardly protruding flanges 21 and 22, which engage behind the collars 20.

A profiled seal designated in total with reference numeral 23, is subdivided into an outer profiled section or member 24 and an inner profiled section or member 25. The latter is surrounded by a sleeve 26 which is of such a length in the axial direction as corresponds to the inner clearance between flanges 21 or 22.

The outer profiled section 24 has an outer layer 27 made from a softer material. At the inside of the sleeve 26 is formed an annular groove 28 into which is inserted the outer profiled section 24. The layer 27 and a part of the remaining cross-section of the outer profiled section 24 are disposed in the annular groove 28.

The outer profiled section 24 is so dimensioned in the axial direction that its faces cannot come into contact with the edge of a collar 20 adjacent to the pipe jacket even when the pipe 19 is disposed in the position shown in FIG. 3.

The inner profiled section 25 of the profiled seal 23 has an approximately V-shaped cross-section and forms two sealing lips, between which the pressure of the working medium can be effective in the axial direction. Thus, an appropriate pressing of the sealing lips is secured against the faces of the collars 20. The inner profiled section 25 has an outer layer 29 made from a softer material, which fills in a part of the space formed between the sealing lips of the inner profiled section 25 and the outer profiled section 24, and prevents the collapse of the sealing lips, particularly during assembly.

Figure 2:
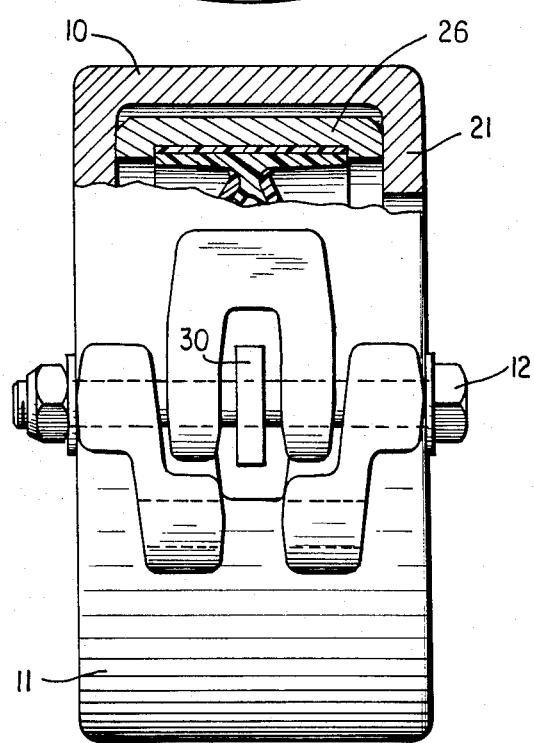
FIG. 2 is a side view of the device shown in FIG. 1.

As shown by FIG. 2, the sleeve 26 has a radially outwardly extending shoulder 30 of the type having a tongue which is passed through by the hinge pin 12. The sleeve 26 is thus undetachably secured to the clamp sections 11 and 12.

Figure 5:
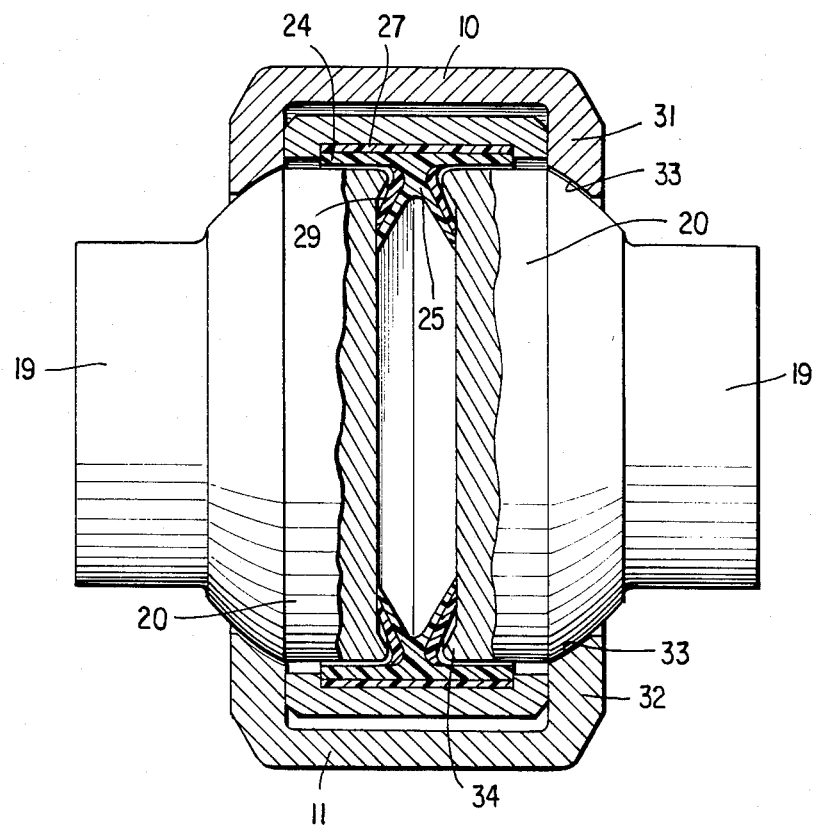
FIG. 5 is a longitudinal section of a modified embodiment of the device.

In the embodiment shown in FIG. 5, the same parts are designated with the same reference numerals. Contrary to the previously described embodiment, the clamp sections 10 and 11 now have flanges 31 and 32 which are adapted at their inner sides to the transfer surfaces 33. The transfer surfaces 33 thus form with the flanges 31 and 32 a head-and-socket joint by which the flanged pipes 19 can be guided with respect to the clamp sections 10 and 11, particularly when deflected from the mutually co-axial position.

The collars 20 of the flanged pipes 19 have each in its outer peripheral region a bulge 34 on the face, which projects in the axial direction and which reaches into the space between the outer profiled section 24 and the sealing lips of the inner profiled section 25. Thus, the bulge 34 can serve the purpose of supporting the sealing lips of the inner profiled section 25.

What is claimed is:

1. A device for connecting the ends of two pipes wherein each of said ends is provided with an annular collar having a front face at an end of the pipe, a rear face spaced axially from said front face and a peripheral surface between the front and rear faces thereof, comprising:

a clamp having at least two sections, each section of said clamp including a radially inwardly projecting flange at each axial end thereof for engaging the rear surfaces of said collars when the ends of said pipes are placed adjacent each other;

an annular elastic inner profiled member having a pair of sealing lips for contacting the front faces of said collars, said inner profiled member being disposed between the front faces of said collars and forming an approximately V-shaped cross-section extending radially inward; and an outer annular member surrounding the peripheral surfaces of said collars and being attached to said inner profiled member, said outer annular member extending axially to the radially inwardly projecting flanges of said clamp thereby substantially preventing axial movement of said inner profiled member with respect to said clamp regardless of the relative deflection of said collars from a coaxial position.

2. A device as claimed in claim 1, wherein said outer annular member comprises a sleeve portion in contact with the flanges of said clamp and an elastic outer profiled member interposed between said sleeve and said inner profiled member.

3. A device as claimed in claim 1, wherein said outer annular member comprises an elastic outer profiled member.

4. A device as claimed in claim 2, wherein the axial length of said sleeve is slightly in excess of the axial length of said elastic outer profiled member.

5. A device as claimed in claim 2, wherein said elastic outer profiled member includes outer and inner layers, said outer layer being formed of a material which is softer than that of said inner layer, said elastic outer profiled member being inserted in an inner radial groove provided in said sleeve.

6. A device according to claim 1, wherein said inner profiled member includes outer and inner layers, said outer layer being formed of a material which is softer than that of said inner layer.

7. A device as claimed in claim 2, wherein said inner profiled member includes outer and inner layers, said outer layer being formed of a material which is softer than that of said inner layer, the thickness of said outer layer of said inner profiled member gradually increasing in a generally radial direction towards said outer profiled member.

8. A device according to claim 1, wherein each of said collars is provided at its peripheral surface with a bulge protruding axially away from the front face thereof.

9. A device as claimed in claim 2, wherein said clamp further comprises a hinge pin for hingedly securing said two sections to each other at one end thereof, and wherein said sleeve is provided with an outwardly extending shoulder engaging said hinge pin.

10. In combination, a pair of pipes each provided with a collar having a front face at an end of the pipe, a rear face spaced axially from said front face and a peripheral surface between the front and rear faces thereof;
  a clamp having at least two sections, each section of said clamp including a radially inwardly projecting flange at each axial end thereof for engaging the rear surfaces of said collars when the ends of said pipes are placed adjacent each other;
  an annular elastic inner profiled member having a pair of sealing lips for contacting the front faces of said collars, said inner profiled member being disposed between the front faces of said collars and forming an approximately V-shaped cross-section extending radially inward; and
  an outer annular member surrounding the peripheral surfaces of said collars and being attached to said inner profiled member, said outer annular member extending axially to the radially inwardly projecting flanges of said clamp thereby substantially preventing axial movement of said inner profiled member with respect to said clamp regardless of the relative deflection of said collars from a coaxial position.

11. The combination claimed in claim 10, wherein said outer annular member comprises a sleeve portion in contact with the flanges of said clamp and an elastic outer profiled member interposed between said sleeve and said inner profiled member.

12. The combination claimed in claim 10, wherein said outer annular member comprises an elastic outer profiled member.

13. The combination claimed in claim 11, wherein the axial length of said sleeve is slightly in excess of the axial length of said elastic outer profiled member.

14. The combination claimed in claim 11, wherein said elastic outer profiled member includes outer and inner layers, said outer layer being formed of a material which is softer than that of said inner layer, said elastic outer profiled member being inserted in an inner radial groove provided in said sleeve.

15. The combination claimed in claim 10, wherein said inner profiled member includes outer and inner layers, said outer layer being formed of a material which is softer than that of said inner layer.

16. The combination claimed in claim 11, wherein said inner profiled member includes outer and inner layers, said outer layer being formed of a material which is softer than that of said inner layer, the thickness of said outer layer of said inner profiled member gradually increasing in a generally radial direction towards said outer profiled member.

17. The combination claimed in claim 10, wherein each of said collars has an annular bulge protruding axially towards the other collar, said bulge being disposed near its peripheral surface.

18. A device according to claim 10, wherein the rear face of each collar is spherical or frusto-conical and the radially inwardly projecting flange of each section of said clamp has an inner peripheral surface having a shape complementary with that of the rear face of said collar.

19. A device according to claim 11, wherein said clamp further comprises a hinge pin for hingedly securing said two sections to each other at one end thereof, and wherein said sleeve is provided with an outwardly extending shoulder engaging said pin.

* * * * *